United States Patent [19]

Hayashida et al.

[11] Patent Number: 5,462,777
[45] Date of Patent: Oct. 31, 1995

[54] WRAPPING MULTILAYER FILM

[75] Inventors: Haruo Hayashida; Akihiro Ichige, both of Chiba; Tadatoshi Ogawa; Takeshi Yamada, both of Osaka; Teruo Tada, Kagawa; Masaaki Zenigame, Kagawa; Toyoki Wano, Kagawa; Kazuo Kondo, Kagawa, all of Japan

[73] Assignees: Sumitomo Chemical Company, Limited, Osaka; Kura Industrial Company, Limited, Kagawa, both of Japan

[21] Appl. No.: 266,575

[22] Filed: Jun. 28, 1994

[30] Foreign Application Priority Data

Jun. 28, 1993 [JP] Japan ..................... 5-156848

[51] Int. Cl.$^6$ ................ B32B 27/08; B32B 27/32; B65D 71/00
[52] U.S. Cl. ............... 428/2; 428/349; 428/516; 428/910; 428/913
[58] Field of Search ................. 428/516, 2, 913, 428/349, 910, 218

[56] References Cited

U.S. PATENT DOCUMENTS

| | | | |
|---|---|---|---|
| 4,198,256 | 4/1980 | Andrews et al. | 156/229 |
| 4,410,602 | 10/1983 | Komoda et al. | 428/516 |
| 4,511,609 | 4/1985 | Craver et al. | 428/2 |
| 4,692,386 | 9/1987 | Schinkel et al. | 428/515 |
| 4,705,708 | 11/1987 | Briggs et al. | 428/35 |
| 4,923,750 | 5/1990 | Jones | 428/349 |

FOREIGN PATENT DOCUMENTS

| | | |
|---|---|---|
| 0201798 | 11/1986 | European Pat. Off. . |
| 63-173641A3 | 7/1988 | Japan . |
| 1532180 | 11/1978 | United Kingdom . |
| 2027720A | 2/1980 | United Kingdom . |

OTHER PUBLICATIONS

Derwent 86-323367.
European Search Report No. 94 30 4661.

Primary Examiner—P. C. Sluby
Attorney, Agent, or Firm—Sughrue, Mion, Zinn, Macpeak & Seas

[57] ABSTRACT

A wrapping multilayer film comprising at least 5 layers of (A) both the outermost layers each comprising an ethylene-α-olefin copolymer having an ethylene content of at least 50 mol %, (B) layers each comprising a propylene polymer and being disposed between the outermost layers (A), and (C) a layer comprising recycled resins and being disposed between the layers (B).

4 Claims, No Drawings

WRAPPING MULTILAYER FILM

FIELD OF THE INVENTION

The present invention relates to a wrapping multilayer film. More particularly, the present invention relates to a wrapping multilayer film having a good safety hygiene property, a good transparency, a good mechanical strength, and a low-temperature heat sealing property, showing a good automatic wrapping aptitude, and being excellent in the economical property.

BACKGROUND OF THE INVENTION

A wrapping method with a film includes various kinds of wrapping methods utilizing the characteristics of each film, such as a method of sealing in a bag form, an overlapping method, a stretch wrapping method, a spin packing method, etc. Further, a single layer film mainly using an ordinary resin such as polyethylene, polypropylene, polyvinyl chloride, etc., are generally used as the film used for these methods. However, with the increase of the level required for the wrapping film, the variety of the wrapping film, and the change of the social needs, the cases that these films cannot deal with are increased.

For example, foods such as fruits, fresh fishes, fresh meats, vegitables, etc., are directly placed on a plastic tray, and a vinyl chloride resin film is, hitherto, mainly used as a film for stretch wrapping these foods. Recently, from the problem of a safety hygiene property and the increase of the consciousness for the earth environment, the development has been actively carried out on using the films of an ethylene resin such as a low-density polyethylene resin, an ethylene-vinyl acetate copolymer, etc., causing less problems of safety hygiene and environmental pollution in place of the conventional polyvinyl chloride.

However, in the case of using a low-density polyethylene resin, etc., alone, it was impossible to simultaneously satisfy the desired self-adhesive property, the low-temperature heat sealing property, and the flexibility of a film. Further, in an ethylene-vinyl acetate copolymer resin film, by properly selecting the content of vinyl acetate, the molecular weight of the copolymer, etc., the problem in the case of using the low-density polyethylene resin film described above could be solved to some extent, but when the corner of the tray was sharp or foods having a sharp site were packed, a problem occurred that the film was broken as being teared.

Thus, the inventors previously proposed a wrapping multilayer film aiming at simultaneously meeting the necessary properties by combining an ethylene polymer layer and a propylene copolmer layer as described in the specifications of Japanese Patent Application Nos. 4-195210, 5-150366, 5-150367, 5-150368, and 4-195214.

However, although for producing such a multilayer film economically with a good efficiency, it is effective to additionally dispose, for example, a recycled resin layer containing trimming losses, etc., formed at the production of the films, there is a problem that the film is whitened at heat-sealing the film according to the manner of disposing the recycled resin layer.

SUMMARY OF THE INVENTION

As a result of various investigations to overcome the problems described above, it has been found that a wrapping multilayer film satisfying all the requirements can be obtained by employing a specific resin layer construction and specifying the disposition of the resin layers. The present invention has been attained based on this finding.

Accordingly, an object of the present invention is to provide a wrapping multilayer film which is produced economically and with a good efficiency by utilizing recycled resins, has a good safety hygiene property, a good transparency, and a high mechancial strength, is excellent in the low-temperature heat-sealing property at automatic wrapping, and is difficult to cause whitening at heat sealing.

According to the present invention, there is provided a wrapping multilayer film comprising at least 5 resin layers of (A) both the outermost layers each comprising an ethylene-α-olefin copolymer having an ethylene content of at least 50 mol %, (B) layers each comprising a propylene polymer and being disposed between the outermost layers (A), and (C) a layer comprising recycled resins and being disposed between the layers (B).

DETAILED DESCRIPTION OF THE INVENTION

The present invention is described in detail below.

The ethylene-α-olefin copolymer having an ethylene content of at least 50 mol % used as the layer (A) in the present invention is obtained by copolymerizing ethylene and an α-olefin having from 3 to 18 carbon atoms using a transition metal catalyst. The copolymerization reaction is usually conducted at a temperature of from 30° C. to 300° C. under a pressure of from atmospheric pressure to 3,000 kg/cm$^2$ in the presence or absence of a solvent in a vapor-solid phase, a liquid-solid phase, or a homogeneous liquid phase. As the transition metal catalyst, a titanium catalyst and a vanadium catalyst are preferred from the standpoints of the copolymerizability and the quality of the ethylene-α-olefin copolymer obtained.

The ethylene-α-olefin copolymer has a melt flow rate of from 0.1 to 30 g/10 minutes, and preferably from 0.3 to 20 g/10 minutes. If the melt flow rate is lower than 0.1 g/10 minutes, the processability of the film becomes undesirably difficult and if the melt flow rate is over 30 g/10 minutes, the working stability of the film in the inflation processing, etc., undesirably deteriorates.

The ethylene-α-olefin copolymer obtained by using a titanium catalyst, used in the present invention is a copolymer of ethylene and an α-olefin having from 4 to 10 carbon atoms, and the density thereof is from 0.870/cm$^3$ to 0,935 g/cm$^3$, and preferably from 0,880 g/cm$^3$ to 0,920 g/cm$^3$. If the density of the copolymer is lower than 0,870 g/cm$^3$, the processability of such a copolymer becomes undesirably difficult and if the density is over 0,935 g/cm$^3$, the transparency and the low-temperature heat sealing property are undesirably reduced.

The ethylene-α-olefin copolymer obtained by using a vanadium catalyst, used in the present invention is a copolymer of ethylene and an α-olefin having from 3 to 10 carbon atoms and can be obtained by the method described in, e.g., JP-A-2-77410 (the term "JP-A" as used herein means an "unexamined published Japanese patent application"). That is, the copolymer is obtained by copolymerizing ethylene and an α-olefin having 3 to 10 carbon atoms in a hydrocarbon solvent using a catalyst system of (a) a vanadium compound represented by the formula, VO(OR)$_n$X$_{3-n}$ (wherein R represents a hydrocarbon group, X represents a halogen atom, and 0<n<3) as a transition metal component, (b) an organoaluminum compound represented by the formula, $R'_m AlX_{3-m}$ (wherein $R'$ represents a hydrocarbon group, X represents a halogen atom, and 1<m<3) as an organometal component, and (c) an ester compound (hereinafter referred to as "M") represented by the formula $R''(C=O)OR'''$ (wherein $R''$ represents an organic group having from 1 to 20 carbon atoms, which is partially or wholly substituted with halogen atoms, and $R'''$ represents a hydrocarbon group having from 1 to 20 carbon atoms) as a third component, wherein the copolymerization is conducted under a catalystic condition that Al/V (molar ratio) is at least 2.5 and M/V (molar ratio) is at least 1.5, at a molar ratio of ethylene and the α-olefin of from 35/65 to 60/40, at a temperature of from 40° C. to 80° C., and in the state of a hydrocarbon solvent-insoluble polymer (slurry portion) and a hydrocarbon solvent-soluble polymer (solution portion).

The ethylene-α-olefin copolymer can also be obtained by copolymerizing ethylene and an α-olefin in the same manner as described above using a vanadium compound obtained by reacting vanadium trichloride and an alcohol as the transition metal component (a), as described in JP-A-60-226514.

The ethylene-α-olefin copolymer obtained using the vanadium catalyst has a density of from 0.870 g/cm³ to 0.915 g/cm³ and preferably from 0.880 g/cm³ to 0.910 g/cm³. If the density is lower than 0.870 g/cm³, the tackiness of the surface of the film becomes undesirably too strong and if the density is over 0.970 g/cm³, the low-temperature sealing property is undesirably reduced.

Of the ethylene-α-olefin copolymers obtained using the vanadium catalyst, the copolymer having the properties that the content of the α-olefin is from 2 to 20 mol %, the maximum fusion peak temperature by a differential scanning calorimeter (DSC) is in the range of from 60° C. to less than 100° C., and the proportion of the fusion heat at that peak in the total heat of fusion is at least 0.8 is preferred.

Examples of the propylene polymer for forming the layer (B) in the present invention are a propylene homopolymer, a propylene-ethylene copolymer having an ethylene content of 20 mol % or less, a propylene-butene-1 copolymer, a propylene-butene-1-ethylene copolymer having an ethylene content of 20 mol % or less, and a propylene-α-olefin copolymer containing an α-olefin having at least 5 carbon atoms alone or together with the above-described α-olefin. Of these copolymers, the propylene-ethylene copolymer having the ethylene content of from 3 to 12 mol % is preferred in the point of the balance between the transparency and the mechanical strength.

The propylene polymer used in the present invention has a melt flow rate of from 0.5 g/10 minutes to 20 g/10 minutes, and preferably from 1.0 g/10 minutes to 10 g/10 minutes. If the melt flow rate thereof is lower than 0.5 g/10 minutes, the processability of the film becomes undesirably difficult and if the melt flow rate is over 20 g/10 minutes, the stability in the inflation film processing undesirably becomes poor.

The recycled resins for forming the layer (C) used in the present invention are resins containing trimming losses, etc., formed at the production of the wrapping multilayer film of the present invention.

That is, the layer comprising the recycled resins contains the ethylene-α-olefin copolymer having the ethylene content of 50 mol % or more for forming the layer (A) and the propylene polymer for forming the layer (B) as the trimming losses, etc., but may further contain other resin or resins.

In the film construction in the present invention, the multilayer film comprising at least 5 layers has the characteristic that each of both the outermost layers (A) is the layer comprising the ethylene-α-olefin copolymer having the ethylene content of at least 50 mol % and from each layer (A), the layers (B) comprising the propylene polymer and the layer (C) comprising the recycled resins are successively disposed toward the opposite side. Namely, the layers (B) are disposed between the outermost layers (A), and the layer (C) is disposed between the layers (B). The reason of disposing the layers (A) of the ethylene-α-olefin copolymer having the ethylene content of at least 50 mol % as both the outermost layers of the multilayer film in the present invention is that the multilayer film of the present invention is liable to be imparted with a low-temperature heat-sealing property and a self-adhesive property. Further, the reason that the layers (B) comprising the propylene polymer are disposed at the outer side than the layer (C) comprising the recycled resins is mainly to prevent the occurrence of whitening at heat sealing.

That is, as a result of various investigations on the cause of the occurrence of whitening of the sealing portion at heat sealing, it has been found that the layer (C) comprising the recycled resins used in the present invention comprises the ethylene-α-olefin copolymer having the ethylene content of at least 50 mol % for forming the layers (A) and the propylene polymer for forming the layers (B) as the trimming losses thereof, etc., but since the ethylene-α-olefin copolymer is incompatible with the propylene polymer, they exist in a phase-separated structure state and in the case of relaxing at heat sealing the molecular orientation formed in the film processing step, the phase comprising the ethylene-α-olefin copolymer having the ethylene content of at least 50 mol % for forming the layer (A) is not uniformly relaxed with the phase comprising the propylene polymer for forming the layer (B), whereby unevenness is formed on the surface of the layer (C), which propagates to the surface of the multilayer film to cause whitening.

Furthermore, it has been found that by disposing the layers (B) comprising the propylene polymer having a relatively high heat resistance as compared with other layers and keeping the rigidity of the multilayer film of the present invention at the temperature in the case of heat sealing at each of the outer sides of the layer (C) comprising the recycled resins, the formation of the surface unevenness of the whole multilayer film occurring at heat sealing can be prevented.

The practical embodiments of the layer structure of the multilayer film of the present invention are, for example, (A)/(B)/(C)/(B)/(A), (A)/(X-1)/(B)/(C)/(B)/(A), (A)/(B)/(X-2)/(C)/(B)/(A), (A)/(B)/(X-3)/(C)/(X-4)/(B)/(A), (A)/(B)/(X-5)/(C)/(X-6)/(B)/(X-7)/(A), etc., wherein X-1, X-2, - - - , X-7 means a layer of an optional other polymer such as polyethylene, polypropylene, etc.

In the thickness construction of the multilayer film of the present invention, it is preferred from the point of the balance of various properties of the multilayer film that the thickness ratio of the layers (A) comprising the ethylene-α-olefin copolymer is from 20 to 50%, that of the layers (B) comprising the propylene polymer is from 20 to 50%, and that of the layer (C) comprising the recycled resins is from 20 to 60%. The total thickness of the multilayer film of the present invention is preferably from 6 to 40 µm.

The resin or the resin composition of each layer constituting the multilayer film of the present invention can, if necessary, contains a resin-modifier such as polybutene, polyisobutylene, a petroleum resin, a polyethylene wax, atactic polypropylene, etc. The resin or the resin composition can further contain additives such as a tackifier, an antioxidant, an antistatic agent, a lubricant, an antiblocking agent, an antifogging agent, etc.

For producing the multilayer film of the present invention, a method wherein after making films by an ordinary method such as an inflation method, a T-die method, etc., the films are heat-laminated or a method of forming the multilayer film by an inflation film molding machine or T-die film molding machine of the co-extrusion type of 3 kinds 5 layers or 4 kinds 6 layers can be used. Further, the multilayer film can be formed by laminating other films on either film formed by a conventional method such as an extrusion lamination, etc.

For imparting a sufficient elasticity to the wrapping multilayer film of the present invention, it is preferred to stretch the film to at least one axial direction after forming the film. Stretching may be uniaxial stretching or biaxial stretching. In the case of uniaxial stretching, a roll stretching method which is usually used is preferred. In the case of biaxial stretching, a successive stretching method wherein after stretching the film to one axial direction, the film is then stretched to another direction or a method of simultaneously biaxially stretching the film by, for example, tubular stretching may be employed. The stretching ratio at stretching is preferably from 2 to 30 times, and more preferably from 3 to 25 times as an area ratio.

The present invention is explained in more detail by reference to the following examples, but it should be understood that the invention is not construed as being limited thereto.

The measurement methods of properties in the examples and the comparative examples are explained below.

(1) Density:

Measured according to the method defined by JIS K6760. After annealing each material in water at 100° C. for 1 hour, the density was measured.

(2) Melt Flow Rate (MFR):

MFR of the ethylene-α-olefin polymer for the layer (A) was measured according to the method defined by JIS K6760.

MFR of the propylene polymer for the layer (B) was measured according to the method defined by JIS K6758.

(3) α-olefin content in the ethylene-α-olefin copolymer for the layer (A):

The content was obtained from the material balance. In addition, the content of butene-1 was determined from the characristic absorption thereof at 770 cm$^{-1}$ using an infrared spectrophotometer and the result of the material balance was confirmed.

(4) Ethylene content in the propylene polymer for the layer (B):

The content was obtained from the material balance. Further, the ethylene content was determined from the characteristic absorptions of ethylene at 732 cm$^{-1}$ and 720 cm$^{-1}$ using an infrared spectrophotometer and the result of the material balance was confirmed. In addition, in the measurement by the infrared spectrophotometer, a calibration curve was prepared by the determined values by the radiation measurement of an ethylene copolymer labelled with $^{14}$C.

(5) Haze:

Measured according to the method defined by ASTM D1003. As the value is smaller, the transparency is better.

(6) Gloss:

Measured according to the method defined by ASTM D523. As the value is larger, the gloss is better.

(7) Tensile Strength:

Measured according to the method defined by ASTM D882.

(8) Shearing Tackiness:

Two test pieces each having a width of 1 cm and a length of 3 cm were adhered each other by the tackiness of themselves and the largest load at pulling them to the shearing direction was measured.

(9) Heat Sealing Property:

Two films were superposed each other and heat-sealed using a heat sealer manufactured by Tester Sangyo K. K., under the conditions of 120° C., a sealing surface pressure of 1.0 kg/cm$^2$, and a sealing time of 2.0 seconds with a sealing width of 10 mm. The sample was cut at a right angle to the sealed surface to obtain a test piece of 15 mm and the 180° peeling strength was measured at a rate of 200 mm/minute using a Schopper type tensile tester.

(10) Sealable Temperature Width:

A wrapping test was conducted using a tray stretch lapper STCIII-B manufactured by Ohmori Kikai K. K. under the following conditions and the interval between the lowest temperature at which a sufficient sealed strenth can be obtained and the temperature at which whitening or a hole opening began with melting at heat sealing at the bottom of the tray performed in automatic wrapping was defined as a sealable width.

Film width: 300 mm

Tray size: length 195 mm×width 110 mm×height 25 mm

Weight of wrapping material: 500 g

Wrapping speed: 50 packages/minute

Chute belt speed: about 15 meters/minute

EXAMPLE 1

A tubular coextruded laminate layer unstretched raw sheet composed of both the outermost layers (A) each composed of an ethylene-butene 1 copolymer having a density of 0.895 g/cm$^3$, a melt flow rate of 2.0 g/10 minutes, and a butene 1 content of 13% by weight, produced using a vanadium catalyst, interlayers (B) composed of a propylene-ethylene copolymer having a melt flow rate of 3.0 g/10 minutes and an ethylene content of % by weight each disposed between both the outermost layers, and a core layer (C) composed of recycled resins obtained as trimming losses disposed between the interlayers was obtained by an extruding machine (for the outermost layers) having a screw inside diameter of 65 mm, an extruding machine (for the interlayers) having a screw inside diameter of 50 mm, an extruding machine (for the core layer) having a screw inside diameter of 40 mm, and a co-extruding annular die of 5 layers having an inside diameter of 180 mm. The thickness of the laminate layer unstretched raw sheet obtained was about 120 μm, the thickness ratios of the layers were that both the outermost layers were 30%, the interlayers were 40%, and the core layer was 30%. Further, the tube width was 300 mm. The laminate layer unstretched raw sheet was stretched to 3.3 times in the lengthwise direction and to 3.1 times in the width direction by a tubular stretching and thereafter, heat fixing was conducted while giving a relaxation to some extent, thereby obtaining a laminate stretched film having a total thickness of about 12 μm.

The various characteristic values of the film obtained are shown in Table 1 below. In addition, the occurrence of whitening at heat sealing was not observed.

EXAMPLE 2

A laminate stretched film having a total thickness of about 12 μm was obtained by following the same procedure as in Example 1 except that an ethylene-butene 1 copolymer having a density of 0.905/cm$^3$, a melt flow rate of 2.0 g/10 minutes, and a butene-1 content of 9% by weight obtained using a vanadium catalyst was used for the outermost layers (A) in place of the ethylene-butene 1 copolymer used in Example 1.

The various characteristic values of the film obtained are shown in Table 1 below. In addition, the occurrence of whitening at heat sealing was not observed.

EXAMPLE 3

A laminate stretched film having a total thickness of about 12 μm was obtained by following the same procedure as in Example 1 except that a resin composition composed of 95% by weight of an ethylene-hexene-1 copolymer [Sumikathene α (registered trade name) FZ102-0, made by Sumitomo Chemical Company, Limited, density 0,912 g/cm$^3$ and melt follow rate 0.8 g/10 minutes] produced using a titanium catalyst and 5% by weight of polyisobutylene was used for the outermost layers (A) in place of the ethylene-butene 1 copolymer used in Example 1.

The various characteristic values of the film obtained are shown in Table 1 below. In addition, the occurrence of whitening at heat sealing was not observed.

EXAMPLE 4

A laminate stretched film having a total thickness of about 12 μm was obtained by following the same procedure as in Example 1 except that the thickness ratios of the layers were changed to that the both the outermost layers (A) were 30%, the interlayers (B) were 30%, and the core layer (C) was 40%.

The various characteristic values of the film obtained are shown in Table 1 below. In addition, the occurrence of whitening at heat sealing was not observed.

COMPARATIVE EXAMPLE 1

A laminate layer stretched film having a total thickness of 12 μm was obtained by following the same procedure as in Example 1 except that the copolymer for the interlayers (B) was replaced with the recycled resins for the core layer in Example 1, that is, the recycled resins obtained as trimming losses were used for the interlayers and the propylene-ethylene copolymer having a melt flow rate of 3.0 g/10 minutes and an ethylene content of 4.6% by weight was used for the core layer.

The various characteristic values of the film obtained are shown in Table 1. In addition, since the film was poor in the stretching stability, unstretched portions were formed and the occurrence of whitening at heat sealing was observed.

COMPARATIVE EXAMPLE 2

A laminate layer stretched film having a total thickness of about 12 μm was obtained by following the same procedure as in Example 2 except that the copolymer for the interlayers (B) was replaced with the recycled resins for the core layer in Example 2, that is, the recycled resins obtained as the trimming losses were used as the interlayers and the propylene-ethylene copolymer having a melt flow rate of 3.0 g/10 minutes and an ethylene content of 4.6% by weight was used as the core layer.

The various characteristic values of the film obtained are shown in Table 1 below. In addition, since the stretching stability of the film was poor in the stretching stability, unstretched portions were formed and the occurrence of whitening at heat sealing was observed.

COMPARATIVE EXAMPLE 3

A laminate stretched film having a total thickness of about 12 μm was obtained by following the same procedure as in Example 3 except that the copolymer for the interlayers (B) was replaced with the recycled resins for the core layer in Example 3, that is, the recycled resins obtained as trimming losses were used as the interlayers and the propylene-ethylene copolymer having a melt flow rate of 3.0 g/10 minutes and an ethylene content of 4.6% by weight was used as the core layer.

The characteristic values of the film obtained are shown in Table 1 below. In addition, since the film was poor in the stretching stability, unstretched portions were formed and the occurrence of whitening at heat sealing was observed.

COMPARATIVE EXAMPLE 4

A laminate stretched film having a total thickness of about 12 μm was obtained by following the same procedure as in Example 1 except that the copolymer for the interlayers (B) was replaced with the recycled resins for the core layer in Example 1, that is, the recycled resins obtained as trimming losses were used as the interlayers and the propylene-ethylene copolymer having a melt flow rate of 3.0 g/10 minutes and the ethylene content of 4.6% by weight was used as the core layer, and further, the thickness ratios of the layers were changed such that the thickness ratio of both the outermost layers (A) was 30%, the thickness ratio of the interlayers was 30%, and the thickness ratio of the core layer was 40%.

The characteritic values of the film obtained are shown in Table 1 below. In addition, since the film was poor in the stretching stability, unstretched portions were formed and the occurrence of whitening at heat sealing was observed.

TABLE 1

|  | Haze (%) | Glass (%) | Tensile strength (kg/cm$^2$) | Shearing tackiness (kg/cm$^2$) | Heat sealing property (kgf) | Sealable temperature width (°C.) |
| --- | --- | --- | --- | --- | --- | --- |
| Example 1 | 0.4 | 145 | 950 | 1020 | 0.65 | 25 |
| Example 2 | 0.5 | 143 | 1000 | 980 | 0.52 | 25 |
| Example 3 | 0.5 | 145 | 1150 | 960 | 0.50 | 20 |
| Example 4 | 0.4 | 144 | 920 | 1090 | 0.65 | 20 |

TABLE 1-continued

|  | Haze (%) | Glass (%) | Tensile strength (kg/cm²) | Shearing tackiness (kg/cm²) | Heat sealing property (kgf) | Sealable temperature width (°C.) |
| --- | --- | --- | --- | --- | --- | --- |
| Comparative Example 1 | 0.9 | 133 | 900 | 950 | 0.63 | 10 |
| Comparative Example 2 | 0.8 | 144 | 910 | 820 | 0.51 | 5 |
| Comparative Example 3 | 0.8 | 143 | 920 | 860 | 0.50 | 0 |
| Comparative Example 4 | 0.9 | 136 | 910 | 940 | 0.60 | 10 |

As described above, according to the present invention, a wrapping multilayer film, which is excellent in the safety hygiene property, the self-adhesive property, the low-temperature heat sealing property, and the flexibility as the automatic wrapping aptitude, is excellent in the transparency and the mechanical strength, and is difficult to cause whitening at heat sealing, can be provided economically with a good efficiency.

While the invention has been described in detail and with reference to specific embodiments thereof, it will be apparent to one skilled in the art that various changes and modifications can be made therein without departing from the spirits and scope thereof.

What is claimed is:

1. A wrapping multilayer film comprising at least 5 layers of (A) both the outermost layers each comprising an ethylene-α-olefin copolymer of an ethylene and an α-olefin having from 3 to 10 carbon atoms, produced using a titanium catalyst or a vanadium catalyst, and having an ethylene content of at least 50 mol % and a density of from 0.870 g/cm³ to 0.915 g/cm³, (B) layers each comprising a propylene-ethylene copolymer having an ethylene content of from 3 to 12 mol % and being disposed between the outermost layers (A), and (C) a layer comprising recycled resins and being disposed between the layers (B), wherein said recycled resins comprise trimming losses consisting essentially of said ethylene-α-olefin copolymer for forming the layer (A) and said propylene-ethylene copolymer for forming the layer (B).

2. A wrapping multilayer film of claim 1, wherein the film is a film stretched uniaxially or biaxially.

3. A wrapping multilayer film of claim 1, wherein said wrapping is stretch wrapping.

4. A wrapping multilayer film of claim 3, wherein the film is a film stretched uniaxially or biaxially.

* * * * *